United States Patent [19]
Hafele

[11] Patent Number: 5,948,371
[45] Date of Patent: *Sep. 7, 1999

[54] CATALYTIC CONVERTER AS WELL AS A MANUFACTURING METHOD THEREFOR

[75] Inventor: Edelbert Hafele, Karlsruhe, Germany

[73] Assignee: Heraeus Electro-Nite International N.V., Houthalen, Belgium

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/666,276
[22] PCT Filed: Dec. 21, 1994
[86] PCT No.: PCT/EP94/04251
  § 371 Date: Feb. 7, 1997
  § 102(e) Date: Feb. 7, 1997
[87] PCT Pub. No.: WO95/17587
  PCT Pub. Date: Jun. 29, 1995

[30] Foreign Application Priority Data

Dec. 21, 1993 [DE] Germany .............................. 43 43 705

[51] Int. Cl.⁶ ...................................................... F01N 3/10
[52] U.S. Cl. ......................... 422/174; 422/173; 422/177; 422/180; 422/199; 60/300; 29/890
[58] Field of Search ..................... 422/171, 174, 422/173, 177, 180, 198, 199, 222, 211; 29/890; 219/543, 552, 553; 392/450, 491, 494, 490; 60/300, 299, 303

[56] References Cited

U.S. PATENT DOCUMENTS

| | | | |
|---|---|---|---|
| 5,094,074 | 3/1992 | Nishitawa et al. | 422/174 |
| 5,174,968 | 12/1992 | Whitenberger | 422/174 |
| 5,505,911 | 4/1996 | Häjele | 422/174 |

FOREIGN PATENT DOCUMENTS

| | | |
|---|---|---|
| 437626 | 7/1991 | European Pat. Off. . |
| 460611 | 12/1991 | European Pat. Off. . |
| 4017360 | 12/1991 | Germany . |
| 9415079 | 7/1994 | WIPO . |

*Primary Examiner*—Hien Tran
*Attorney, Agent, or Firm*—Antonelli, Terry, Stout & Kraus, LLP

[57] ABSTRACT

A catalytic converter for cleaning exhaust from combustion processes, especially exhaust from internal combustion engines, and the manufacturing method thereof, the converter including a housing and a plurality of packets provided therein. Each of the packets includes at least one corrugated foil joined at contact areas to at least one flat foil, preferably by soldering or welding. The flat and/or corrugated foil is provided at least partially with a catalytically active coating. The spaces between the corrugated foil and/or between the at least one flat foil and the at least one corrugated foil define channels running parallel to one another through which the combustion gas flows. At least one electrically heatable foil is connected on or in at least one packet with good heat conduction.

18 Claims, 3 Drawing Sheets

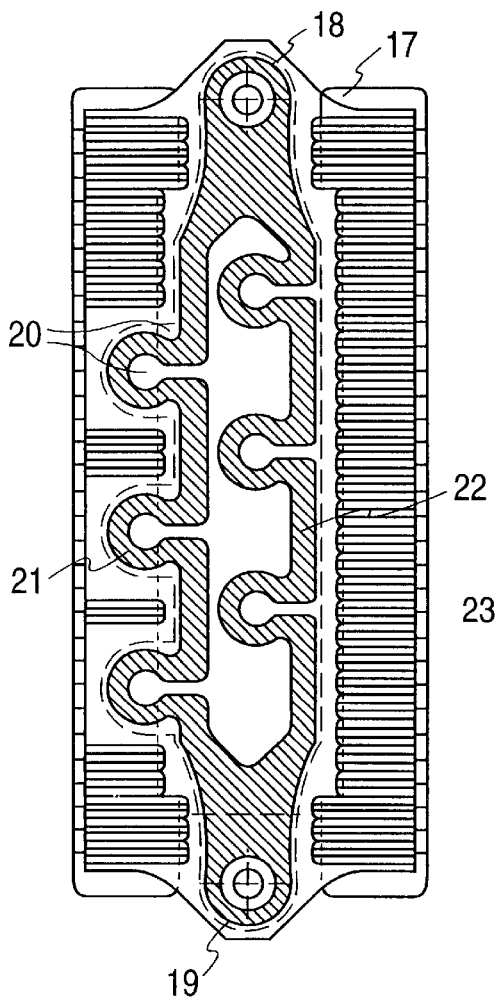
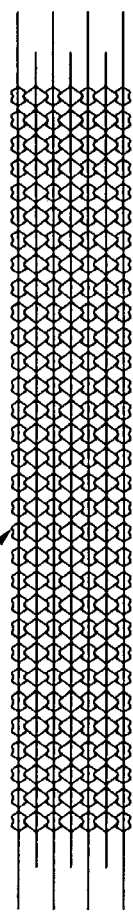
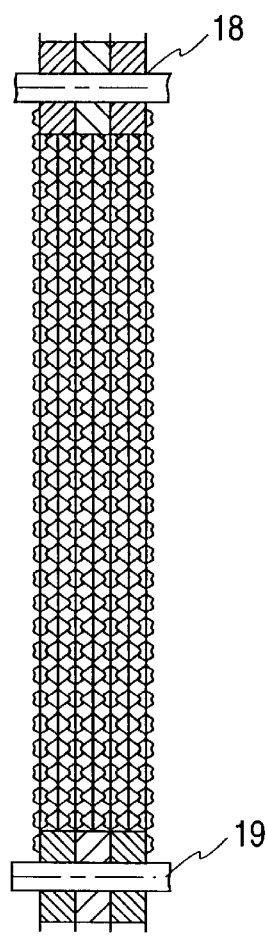
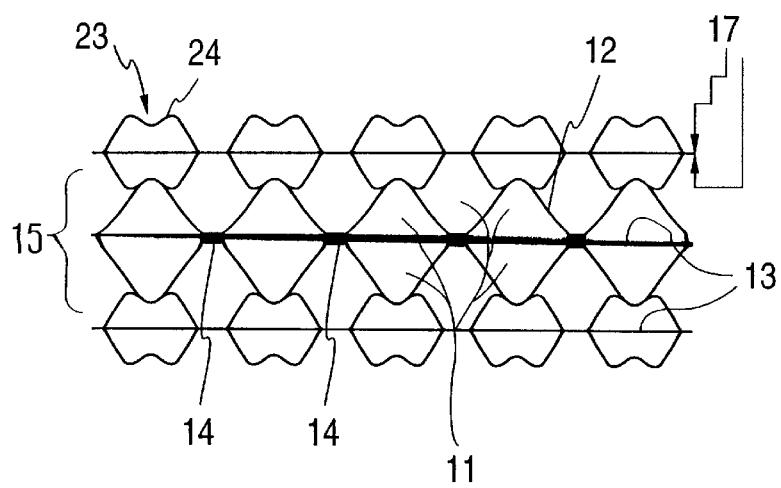

CATALYTIC CONVERTER AS WELL AS A MANUFACTURING METHOD THEREFOR

BACKGROUND OF THE INVENTION

The invention relates to a catalytic converter for cleaning exhaust from combustion processes as well as a manufacturing method therefor, with only so-called metallites according to the species being affected.

Known catalytic converters are subject to problems with non-high-strength construction, especially when the catalytic converters are used in motor vehicles. The continuous mechanical stress as well as thermal expansion, especially in so-called "starter cats" that are heated electrically when beginning operation, pose serious problems.

SUMMARY OF THE INVENTION

The goal of the invention is to propose a catalytic converter with high mechanical strength construction and good compensation of thermal expansion as well as a manufacturing method therefor.

This goal is achieved in a catalytic converter according to the species as well as in a method for manufacturing such a catalytic converter according to the invention.

According to the invention, therefore, packets are initially made from a plurality of metallic, corrugated, and flat foils, preferably by laser welding, said packets being high-strength and mechanically stable in themselves and capable of withstanding thermal stresses. These packets are provided with electrically heatable foils, added into or onto them. These likewise flat, preferably plane heatable foils can also be positively connected with the corrugated foils by welding, said welding being performed only in the metallic area with exclusion of the resistance heating layer. The advantage consists in the good, strong connection of the foils, which have a good heat conducting connection through direct metallic contact with one another.

In the mounted state, the entire unit is then coated with the catalytically active layer, by dipping for example.

By the subsequent application of the catalytically active coating, conversion also takes place in the area of the electrically heatable foil, with the coating also serving as protection for the foil heating. However, it is particularly advantageous that the electrical resistance heating layer of the electrically heatable foil is completely free of any mechanical stress and therefore cannot be damaged even by vibrations at the contact points with other foils and/or sheets, because a good heat-conducting connection with the packet exists only in areas outside the electrical resistance heating layer.

BRIEF DESCRIPTION OF THE DRAWINGS

One preferred embodiment of the invention will now be described in greater detail with reference to the drawings.

FIG. 4 shows the detail in FIG. 3 on a smaller scale;

FIG. 5 shows a section V—V according to FIG. 2;

FIG. 6 shows an electrically heatable foil in a schematic top view; and

FIG. 7 shows detail VII in FIG. 3 in a partially cut away view on a larger scale.

DETAILED DESCRIPTION OF THE PREFERRED EMBODIMENTS

Figure 1:
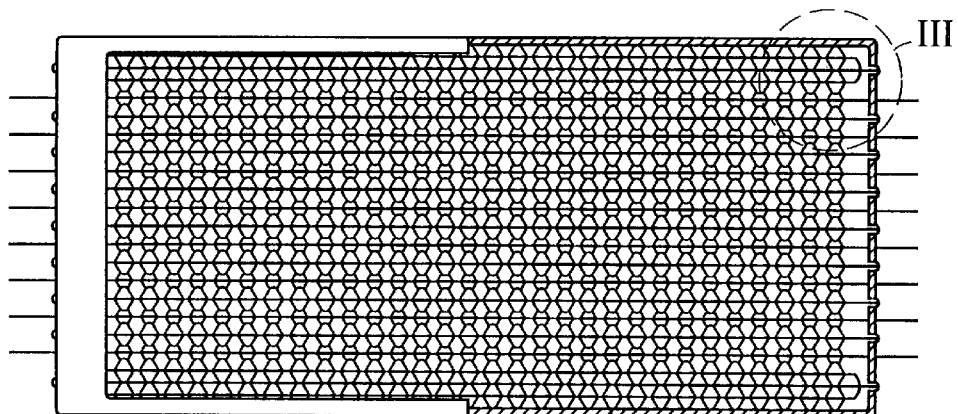
FIG. 1 shows a catalytic converter in a schematic cross section (Section I—I) according to FIG. 2.
Figure 2:
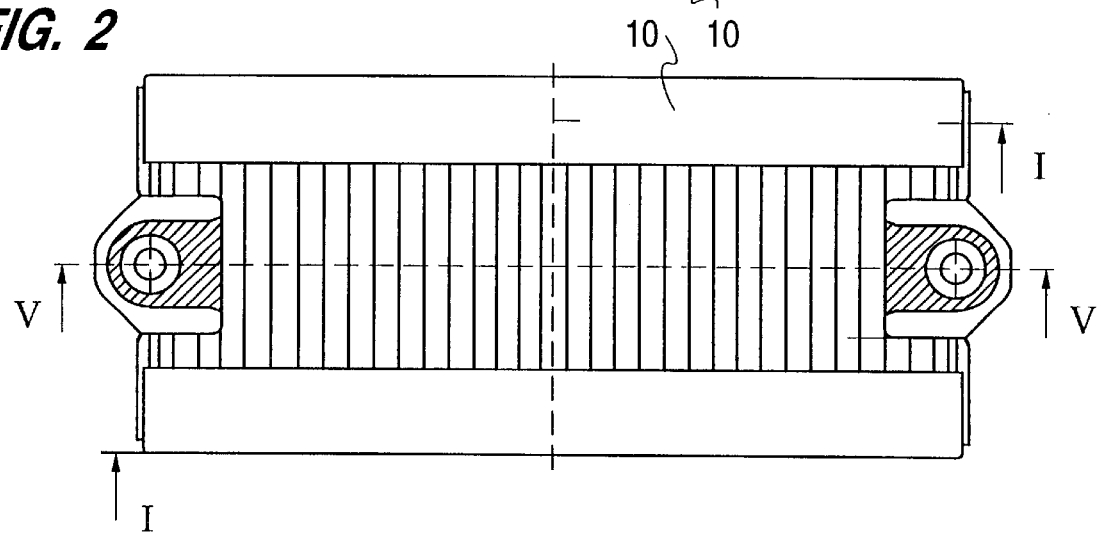
FIG. 2 shows the catalytic converter according to FIG. 1 in a schematic top view.
Figure 3:
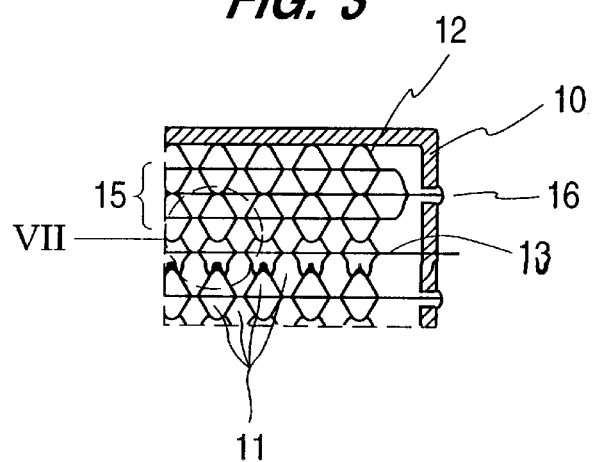
FIG. 3 shows detail III in FIG. 1.

In a housing, designated 10 as a whole in FIG. 1, a plurality of channels 11 (FIG. 3) is provided, said channels running parallel to one another and consisting of intermediate spaces formed between a corrugated foil 12 (FIG. 7). Corrugated foils 12 and flat, plane foil 13 are welded together at contact areas 14 (FIG. 7) which contact areas 14 may be points or lines forming a packet 15. Packets 15 are passed areawise through housing 10 and fastened immovably therein by spot welds 16, for example.

Figure 8:
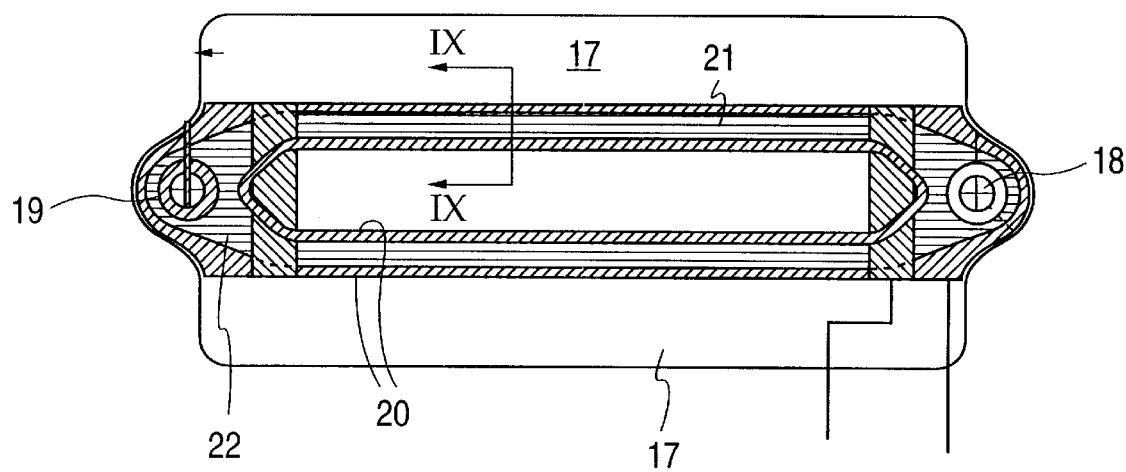
FIG. 8 shows an alternative embodiment of the electrically heatable foil in a top view.
Figure 10:
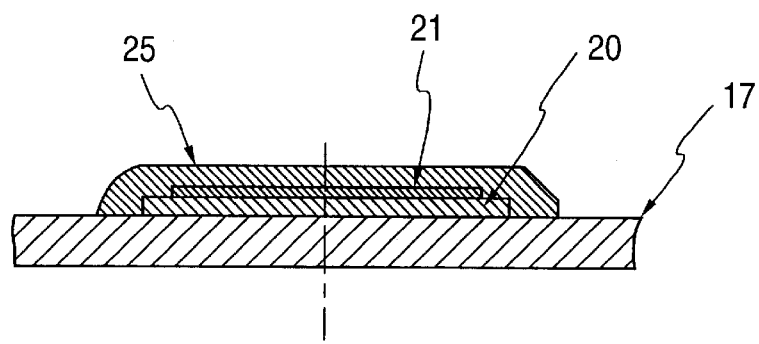
FIG. 10 shows an alternative embodiment of the coating of the electrically heatable foil in FIG. 9.
Figure 9:
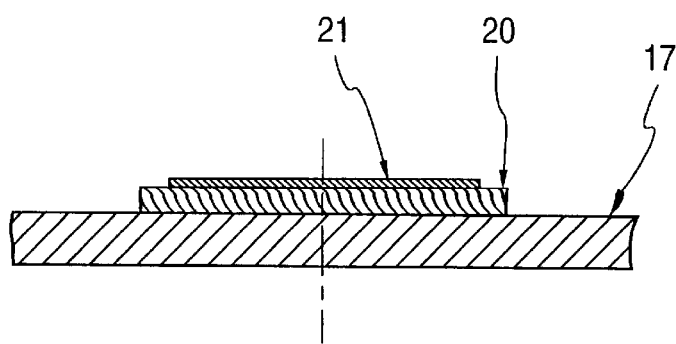
FIG. 9 shows a section IX—IX in FIG. 8.

In addition, an electrically heatable foil 17 (FIG. 6) is provided, which in the embodiment shown has on its front side two electrically conducting resistance heating layers 21, 22 extending between terminal areas 18, 19 and applied to an electrical insulating layer 20 (FIG. 9). These layers can run essentially meanderwise with respect to one another and can be applied by the screen-printing method to electrical insulating layer 20. One alternative embodiment is shown in FIG. 8, with the two electrically resistant heating layers. 21, 22 running parallel to one another and extending linearly. In addition, the two layers 20, 21 can be covered by a protective layer 25, for example a wash coat (FIG. 10). This electrically heatable foil 17, initially formed when the electrical insulating layer and the two electrical resistance heating layers 21, 22 are applied, according to the first embodiment, can be corrugated in areas outside the areas in which the electrically insulating layer 20 and the two electrical resistance heating layers 21, 22 are applied, with the corrugations being adapted to those of corrugated foil 12 (FIG. 7) and with a valley 24 provided in each peak 23; in the alternative embodiment, however, the electrically heatable foil 17 is made flat and welded outside the two electrical resistance heating layers 21, 22 to flat foil 13 of packet 15. Two of these heatable foils 17 can be placed back to back and installed in housing 10 in such fashion that at least on one side, but preferably on both sides, of a packet 15, such a pair of electrically heatable foils 17 is so arranged that a projecting peak of corrugated foil 12 fits snugly into valleys 24 of peaks 23, thus providing a good heat-conducting connection. In addition, this shape ensures that heat stresses can be absorbed by the corrugations without the risk of damage to electrical resistance heating layer 21, 22 of electrically heatable foil 17 located in the flat, non-deformed area of the latter. It is only in this state, but at least in the welded state, of the individual foils or packets that the catalytically active coating is applied.

It is also especially advantageous if, after the starting phase, electrical resistance heating layer 21, 22 is required for example to monitor the function of the catalytic converter. When a constant voltage is applied, depending on the temperature, a certain electrical current is expected, which is measured. If this current corresponds to the operating conditions of the catalytic converter, it can be assumed to be functioning normally. If its value is different, however, it can be concluded that the function of the catalytic converter is deficient.

I claim:

1. Catalytic converter for cleaning exhaust from combustion processes, comprising a housing, a plurality of packets provided therein, each of said packets comprising at least one corrugated foil having corrugations comprising a plurality of peaks; at least one flat foil, the at least one corrugated foil being joined at contact areas to the at least one flat foil, the at least one flat and/or corrugated foil being provided at least partially with a catalytically active coating, spaces between the corrugations of said at least one corrugated foil and/or between said at least one flat foil and said at least one corrugated foil defining channels running parallel to one another; and at least one electrically heatable foil provided on or in at least one packet and having a heat conducting connection to the at least one corrugated foil and/or the at least one flat foil, wherein said at least one electrically heatable foil comprises a foil, an electrical insulating layer provided over at least a portion thereof, and at least one electrical resistance heating layer provided on the electrical insulating layer; and wherein said at least one electrically heatable foil comprises a flat portion at least in a portion in which the electrical resistance heating layer is provided, and includes corrugations in an area outside the flat portion, the corrugations of the electrically heatable foil outside the flat portion comprising a plurality of peaks aligned with the peaks of the at least one corrugated foil, wherein a valley is provided in each peak of the at least one electrically heatable foil, and wherein an aligned peak of the at least one corrugated foil fits within a valley in aligned peak of the at least one electrically heatable foil.

2. Catalytic converter according to claim 1, wherein the at least one corrugated foil and the at least one flat foil are connected with one another at the contact areas by soldering or welding to form the packet.

3. Catalytic converter according to claim 1, wherein corrugations are provided on both sides of the electrically heatable foil.

4. Catalytic converter according to claim 1, wherein the at least one electrically heatable foil is flat, and has a heat-conducting connection to two adjacent corrugated foils of the at least one corrugated foil.

5. Catalytic converter according to claim 4, wherein at least one packet comprises two or more of the at least one electrically heatable foil.

6. Catalytic converter according to claim 1, wherein the at least one electrically heatable foil comprises two electrically heatable foils, each having corrugations comprising a plurality of peaks each having a valley therein, the corrugations being provided on only a first side, the two electrically heatable foils being placed on top of one another with their second sides in contact, and being arranged together between two packets such that the peaks of the corrugated foil rest at least partially in the valleys of the peaks of corrugations of an adjacent one of the two electrically heatable foils.

7. A method for manufacturing the catalytic converter according to claim 1, the method comprising forming said plurality of packets, each packet being formed by joining the at least one corrugated foil to the at least one flat foil in the metallic state, forming the catalytically active coating, and providing the plurality of packets into the housing.

8. Method according to claim 7, wherein the at least one corrugated foil is joined to the at least one flat foil at contact points.

9. Method according to claim 8, wherein the at least one corrugated and flat foils are joined at contact areas by pointwise and/or linewise soldering or welding.

10. Method according to claim 9, wherein the at least one corrugated and flat foils are joined at contact areas by pointwise and/or linewise laser welding.

11. Method according to claim 7, wherein the catalytically active coating is performed by dipping.

12. Method according to claim 7, wherein the at least one electrically heatable foil is provided with an electrical insulating layer.

13. Method according to claim 12, wherein the electrical insulating layer is applied by printing, spraying, dipping, evaporation, or oxidation annealing.

14. Method according to claim 12, wherein at least one electrically conducting resistance heating layer is applied on top of the electrical insulating layer.

15. Method according to claim 14, wherein the at least one electrically conducting resistance heating layer is applied by screen printing.

16. Method according to claim 14, wherein the electrically heatable foil is flat before or after the application of electrical insulating layer or of the electrically conducting resistance heating layer and is then shaped to form corrugations outside the electrical insulating and electrically conducting resistance heating layers.

17. Method according to claim 7, wherein the at least one electrically heatable foil is provided on or in at least one packet and then coated in with a catalytically active layer.

18. Method according to claim 17, wherein the catalytically active layer is obtained by dipping.

* * * * *